3,356,740
PREPARATION OF HYDROXYALKYL-
ADAMANTANES
Abraham Schneider, Overbrook Hills, Pa., assignor to
Sun Oil Company, Philadelphia, Pa., a corporation of
New Jersey
No Drawing. Filed Sept. 10, 1964, Ser. No. 395,557
5 Claims. (Cl. 260—617)

This invention relates to the preparation of monools from alkyladamantanes of the $C_{11}$–$C_{14}$ range having at least one unsubstituted bridgehead position. More specifically the invention pertains to the formation of 1-hydroxyalkyladamantanes by oxidizing by means of a free-oxygen containing gas alkyladamantanes of the following class: methyladamantane, ethyladamantane, dimethyladamantane, methylethyladamantane, trimethyladamantane, and ethyldimethyladamantane.

The carbon nucleus of adamantane (tricyclo-[3.3.1.1$^{3,7}$] decane) contains ten carbon atoms arranged in a completely symmetrical, strainless manner such that four of the carbon atoms occupy bridgehead positions in the rings. The structure of adamantane is often depicted typographically as follows:

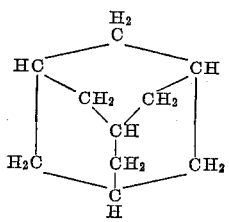

All four bridgehead carbons are equivalent to each other and likewise all rings are equivalent.

In the prior art as described in J. Org. Chem., vol. 26, pages 2207–2212 (1961), adamantane itself has been oxidized by means of air to produce 1-hydroxyadamantane as the principal oxidation product. In this work a solvent for the adamantane was required, a peroxide catalyst was included in the reaction mixture and a high air pressure was utilized. More specifically, a mixture of benzene and glacial acetic acid was used as solvent, both cobalt acetate and di-t-butyl peroxide were employed together as catalysts and an air pressure of 800 p.s.i.g. was employed.

The present invention provides a simplified manner whereby alkyladamantanes can be oxidized to produce mainly the bridgehead monool derivative thereof. The present procedure does not require the use of any solvent or of a peroxide type catalyst, and it avoids the application of high pressure for effecting the oxidation. Preferably the oxidation is carried out at about atmospheric pressure.

According to the invention an alkyladamantane of the $C_{11}$–$C_{14}$ range, selected from the group consisting of methyladamantane, ethyladamantane, dimethyladamantane, methylethyladamantane, trimethyladamantane, and ethyldimethyladamantane, is contacted in the absence of a solvent with a free-oxygen containing gas at a temperature in the range of 110–210° C. and more preferably 120–170° C., the pressure of the gas being less than 50 p.s.i.g. and more preferably being about atmospheric. A small amount of a soluble oxidation catalyst is used, which catalyst is an organic salt of a metal of the group consisting of cobalt, manganese, iron and magnesium. This is the sole catalytic agent used to promote the oxidation. Only more or less trace amounts of the catalyst are required such as from 0.001% to 0.2% by weight of the mixture. Considerably larger amounts (e.g., 1% or 5% or higher) can be used although no benefits will result from using excessive amounts of the catalyst. The contacting of the free oxygen-containing gas with the alkyladamantane at the specified temperature is continued until a suitable degree of conversion has been obtained but is terminated before 70% of the alkyladamantane has been oxidized. By so stopping the oxidation prior to converting 70% of the alkyladamantane the formation of dioxygenated products is minimized and the predominant oxygenated product is the bridgehead monool. The latter can be recovered from the reaction mixture in any suitable manner, e.g., by distillation and/or fractional crystallization.

The starting alkyladamantanes for practicing the present invention can be prepared by the isomerization of tricyclic naphthenic hydrocarbons having the same number of carbon atoms as the desired alkyladamantane. Such isomerization using an aluminum halide catalyst is described in Schneider United States Patent No. 3,128,316, and isomerizations of tricyclic naphthenes using HF-BF$_3$ as catalyst for producing the alkyladamantanes having an ethyl substituent is described in Janoski et al. application Ser. No. 359,401, filed April 13, 1964, now Patent No. 3,275,700. The alkyladamantanes formed by these procedures mainly have the alkyl groups substituted at bridgehead positions, although minor amounts of isomers in which one or more of the alkyl groups are located at non-bridgehead positions are also produced especially if the isomerization reaction is terminated before it reaches completion. By way of example 1,3-dimethyladamantane can be made in good yield from perhydroacenaphthene by contacting the latter with a liquid AlCl$_3$-HCl-hydrocarbon complex catalyst at 35° C. for eight hours; while 1,3,5-trimethyladamantane can be obtained by contacting perhydrofluorene with the same type of catalyst under similar conditions. Again using perhydroacenaphthene, a good yield of 1-ethyladamantane can be obtained by contacting this tricyclic naphthene with HF-BF$_3$ at 85° C. for six hours. As a further example a good yield of 1,3-dimethyl-5-ethyladamantane can be obtained by contacting perhydrophenanthrene with HF-BF$_3$ at 100° C. for eight hours.

The preferred alkyladamantanes for practicing the invention are the following in which all alkyl substituents are located at bridgehead positions: 1-methyladamantane; 1-ethyladamantane; 1,3-dimethyladamantane; 1-methyl-3-ethyladamantane; 1,3,5-trimethyladamantane; and 1,3-dimethyl-5-ethyladamantane. All of these have at least one bridgehead position open so that formation of the hydroxy group at that position can be effected.

The catalyst for promoting the oxidation can be any organic salt of cobalt, manganese, iron or magnesium which is soluble in the starting alkyladamantane in the concentrations specified above at the reaction temperature used. The catalyst can be a salt of practically any organic acid such as acetic, propionic, decanoic, oleic, stearic, naphthenic, oxalic, benzoic and toluic acids. The organic salts of cobalt and manganese are the preferred types of catalysts.

The present oxidation can be carried out merely by blowing air or oxygen at about atmospheric pressure into the starting alkyladamantane having dissolved therein a minor amount of the metal salt catalyst and maintained at a temperature in the specified range. As previously stated the temperature of the reaction mixture should be in the range of 110–210° C. and more preferably 120–170° C. Best results, considering both reaction rate and selectively with respect to formation of the 1-hydroxy derivatives, generally are obtained at a temperature in the range of 130–140° C. The use of high pressure (i.e., above 50 p.s.i.g.) during the contacting is avoided as this will tend to cause dioxygenation of the hydrocarbon. The time of contacting will vary depending upon the particular reaction conditions, but in any event the contacting is stopped before 70% of the alkyladamantane has been converted to oxygenated products. It has been found that if more than 70% of the hydrocarbon is oxidized the yield of dioxygenated products becomes substantial and the yield of bridgehead monohydroxy compound progressively decreases.

The main variables which influence the rate of conversion of the starting alkyladamantane are reaction temperature and partial pressure of oxygen in the reaction zone. The higher the reaction temperature the faster the oxidation takes place and hence the sooner the 70% conversion level is approached. The same applies with respect to oxygen partial pressure which itself is determined by the concentration of oxygen in, and the total pressure of, the feed gas. Hence if pure oxygen is to be used to effect the reaction, a relatively low temperature such as below 150° C. preferably is employed. When air is used at about atmospheric pressure, higher temperatures give good results although best selectivity in the formation of the 1-hydroxy derivative generally is obtained at temperatures below 150° C.

In addition to the 1-hydroxy derivative several other oxygenated compounds are also produced during the reaction in minor proportion relative to the 1-hydroxy compound. The main by-product consists of ketoalkyladamantanes which may include two or more isomers with the keto groups appearing at different secondary carbon atoms of the adamantane nucleus. In addition small amounts of dihydroxyalkyladamantanes and hydroxyketoalkyladamantanes generally also are produced. The 1-hydroxy derivative is the lowest boiling of the oxygenated products although the keto derivative usually boils not far above it.

The following is an illustrative composition of the reaction product which can be obtained when the oxidation is carried, for example, to a 67% conversion level:

|  | Weight percent of product |
|---|---|
| Unreacted alkyladamantane | 33 |
| 1-hydroxy derivative | 42 |
| Keto derivatives | 18 |
| Hydroxyketo derivatives | 5 |
| Other | 2 |
|  | 100 |

Such reaction mixture can be distilled to remove the unreacted alkyladamantane and the remainder can be worked up in several different ways to recover the 1-hydroxy product.

In view of the relatively close boiling points of the 1-hydroxy and keto derivatives it is generally best to recover these together as a single fraction by distillation, leaving the small amount of higher boiling oxygenated products as residue. From the mixture of 1-hydroxy and keto derivatives the former can be recovered at least in part by fractional crystallization using a solvent such as acetone.

A preferred procedure in working up the product involves converting the keto derivatives to the corresponding non-bridgehead hydroxy derivatives by hydrogenation and then isomerizing the latter to the 1-hydroxy derivative. The hydrogenation can be carried out on the distillate fraction containing all of the 1-hydroxy and keto derivatives, or part of the 1-hydroxy derivative can first be removed therefrom by crystallization and the keto compounds mixed with remaining 1-hydroxy compound can be hydrogenated. In either event the product of the hydrogenation step will be a mixture of bridgehead and non-bridgehead hydroxy derivatives. The non-bridgehead hydroxy compounds can then be isomerized to the 1-hydroxy product as hereinafter explained.

Hydrogenation of the ketoalkyladamantanes can be effected in several ways. The hydrogenation can be achieved by using lithium aluminum hydride in ether or sodium borohydride in methanol at ambient temperature as the hydrogenating agent. Alternatively the hydrogenation can be done by employing Adam's platinum oxide catalyst using acetic acid as solvent, ambient temperature and a hydrogen pressure of 2–3 atmospheres. Still another suitable procedure involves the use of Raney nickel at about 100° C. with a hydrogen pressure of about 1000 p.s.i.g. By any of these procedures the keto compounds will be converted to the corresponding secondary alcohols while the 1-hydroxyalkyladamantane will be unaffected. The resulting product of mixed alcohols can, if desired, be used as a plasticizer or as an intermediate for preparing mixed esters containing alkyl-adamantane moieties.

After the mixed alcohols are obtained by hydrogenation, the mixture can be treated so as to convert all of the non-bridgehead alcohols to the 1-hydroxy derivative. This can be done by the procedure disclosed and claimed in my copending application Ser. No. 395,556, filed of even date herewith. In such procedure the non-bridgehead alcohols are isomerized to the 1-hydroxy compound by contacting the mixed alcohols with a concentrated mineral acid, viz. sulfuric acid or phosphoric acid. A weight ratio of concentrated acid to mixed alcohols in the range of 0.5:1 to 2:1 preferably is used. When employing sulfuric acid the temperature should be in the range of 0–30° C., while with phosphoric acid a higher temperature such as 100° C. should be used. The alcohols dissolve in the concentrated acid and the non-bridgehead alcohols isomerize almost immediately to the 1-hydroxy product. The latter can then be recovered from the acid by dilution with water, whereby 1-hydroxyalkyladamantane will be obtained as precipitate. In cases where the mixed alcohols contained some unconverted alkyladamantane, only the alcohols will dissolve in the concentrated acid and the alkyladamantane can be separated from the mixture as an isoluble phase and thereafter recycled to the oxidation step.

The following examples illustrate the invention more specifically:

EXAMPLE I

In this example air was used to oxidize 1,3-dimethyladamantane in the absence of any solvent. The procedure involved merely blowing air at about atmospheric pressure through the charge hydrocarbon containing about 0.005% to dissolved cobalt naphthenate while maintaining the temperature in the range of 166–188° C. More specifically the hydrocarbon was blown with air for 70 minutes and a sample (No. 1) was taken, then was blown for 110 more minutes and another sample (No. 2) was taken, and finally was blown for 120 additional minutes and another sample (No. 3) was obtained. The samples were analyzed by vapor phase chromatography in conjunction with infrared spectra. Table I shows the treating conditions and the results obtained. In the table the term "DMA" means dimethyladamantane and the reaction mixture components are listed in order of increasing boiling points.

TABLE I

|  | Sample No. 1 | Sample No. 2 | Sample No. 3 |
| --- | --- | --- | --- |
| Reaction Temp., °C | 188 | 166–178 | 178–188 |
| Cumulative time, min | 70 | 180 | 300 |
| Product Composition, Wt. Percent: |  |  |  |
| DMA | 69.3 | 44.0 | 32.7 |
| 1-hydroxy DMA | 21.1 | 35.1 | 49.1 |
| Keto DMA | 9.7 | 15.7 | 17.9 |
| Unknowns |  | 0.5 | 0.5 |
| Dihydroxy DMA |  |  | 1.4 |
| Hydroxyketo DMA I |  | 1.2 | 1.9 |
| Hydroxyketo DMA II |  | 3.5 | 3.7 |

The product material listed as hydroxyketone DMA I and that listed as II appeared under different peaks of the chromatograph. It is probable that each of these includes at least two hydroxyketone isomers having boiling points close to each other. From the tabulated data it can be calculated that at the end of the reaction (67.3% conversion) the weight ratio of 1-hydroxy DMA plus keto DMA to all other (higher boiling) oxygenated products was about 8:1. Since the keto DMA can be converted to the 1-hydroxy derivative as previously described, this illustrates how stopping the oxidation before the 70% conversion level is reached will allow a high degree of conversion of the starting alkyladamantane to its 1-hydroxy derivative.

EXAMPLE II

This example illustrates how the selectivity is adversely affected if the oxidation reaction is allowed to proceed beyond the 70% conversion level. 1,3-dimethyladamantane was oxidized in substantially the same manner as in the preceding example except that pure oxygen was susbtituted for air as the oxidizing gas. Temperature conditions, times of sampling and the analytical results are shown in Table II.

TABLE II

|  | Sample No. 1 | Sample No. 2 |
| --- | --- | --- |
| Reaction Temp., °C | 160–184 | 184–186 |
| Cumulative time, min | 122 | 307 |
| Product composition, Wt. Percent: |  |  |
| DMA | 24.7 | 6.1 |
| 1-hydroxy DMA | 38.7 | 35.3 |
| Keto DMA | 19.1 | 21.3 |
| Unknowns | 0.9 | 1.7 |
| Dihydroxy DMA | 5.3 | 14.5 |
| Hydroxyketo DMA I | 5.1 | 11.3 |
| Hydroxyketo DMA II | 6.2 | 9.9 |

It can be seen that even when the first sample was taken the reaction already had proceeded too far, namely, to the 75.3% level. From the data at this stage it can be calculated that the ratio of the 1-hydroxy and keto DMA to the higher boiling oxygenated products was about 3.3:1. By the end of the run (93.9% conversion) this ratio had dropped to about 1.5:1.

EXAMPLE III

The final reaction product from Example I was distilled to remove the unreacted DMA and to obtain a heart cut which contained about 70% 1-hydroxy DMA and 30% keto DMA. This mixture was converted to mixed DMA alcohols in the following manner. About 4.2 g. of the mixture was dissolved in 8 ml. of methanol and the solution was added dropwise to a sodium borohydride solution consisting of 1.5 g. NaBH$_4$, 3 ml. of water and 10 ml. of methanol. After refluxing the resulting mixture for 1 hour, 25 ml. of 10 N aqueous NaOH was added and refluxing was continued for 30 minutes. The mixture was then extracted four times with ether and the ether was evaporated from the combined extracts. About 4.2 g. of mixed DMA alcohols were obtained. From this material substantially pure 1-hydroxy-3,5-dimethyl-adamantane having a melting point of 94° C. was obtained by repeated fractional crystallization from methanol.

EXAMPLE IV 1-ethyladamantane was oxidized by substantially the procedure of Example II using pure oxygen. Results for two reaction times are shown in Table III wherein "EA" is used to designate ethyladamantane.

TABLE III

|  | Sample No. 1 | Sample No. 2 |
| --- | --- | --- |
| Reaction Temp., °C | 165–184 | 184–194 |
| Cumulative time, min | 57 | 110 |
| Product composition, Wt. Percent: |  |  |
| EA | 82.1 | 50.8 |
| 1-hydroxy EA | 14.5 | 37.7 |
| Keto EA [1] | 3.4 | 7.8 |
| Higher boiling products |  | 3.8 |

[1] Included at least three isomers.

From the data for the end of the run (49.2% conversion) it can be calculated that the ratio of 1-hydroxy EA and keto EA to the higher boiling oxygenated products is about 12:1, showing a high degree of selectivity for making the bridgehead alcohol and the keto material which can serve as precursor for additional bridgehead alcohol.

EXAMPLE V

In this example 1,3-dimethyl-5-ethyladamantane was oxidized with air in generally the same manner as set forth in Example I. Results at three reaction times are given in Table IV in which DMEA refers to dimethylethyladamantane.

TABLE IV

|  | Sample No. 1 | Sample No. 2 | Sample No. 3 |
| --- | --- | --- | --- |
| Reaction Temp., °C | 180 | 173–194 | 190–203 |
| Cumulative time, min | 38 | 130 | 220 |
| Product composition, Wt. Percent: |  |  |  |
| DMEA | 85.4 | 63.9 | 31.7 |
| 1-hydroxy DMEA | 10.7 | 26.4 | 45.6 |
| Keto DMEA [1] | 3.9 | 9.8 | 15.8 |
| Higher boiling products |  |  | 6.9 |

[1] Included at least three isomers.

From the data on the final sample (conversion=68.3%) it can be seen that the ratio of the 1-hydroxy and keto products to higher boiling oxygenated products was about 9:1.

Substantially analogous results are obtained when 1-methyladamantane, 1-methyl-3-ethyladamantane or 1,3,5-trimethyladamantane is substituted for the alkyladamantanes shown in the foregoing examples. Also generally similar results are obtained when the starting alkyladamantane contains one or more alkyl groups at non-bridgehead positions.

My copending application Ser. No. 395,580, filed of even date herewith, describes and claims the preparation of 1,3-dihydroxyalkyladamantanes by oxidizing the corresponding hydrocarbon under conditions where the oxidation is carried to a more advanced stage than is reached in the present process.

I claim:

1. Method of preparing hydroxyalkyladamantanes which comprises contacting an alkyladamantane selected from the group consisting of methyladamantane, ethyladamantane, dimethyladamantane, methylethyladamantane, trimethyladamantane, and ethyldimethyladamantane with a free oxygen-containing gas at a temperature in the range of 110–210° C. and in the presence of a small amount of oxidation catalyst consisting of a soluble hydrocarbyl carboxylic acid salt of a metal selected from the group consisting of cobalt, manganese, iron and magnesium, said contacting being effected in the absence of a solvent and under a pressure less than 50 p.s.i.g., whereby oxidation occurs to form bridgehead hydroxyalkyladamantane as the major oxidation product, stopping said contacting before 70% of the alkyladamantane has been oxidized, and recovering 1-hydroxyalkyladamantane from the reaction mixture.

2. Method according to claim 1 wherein said temperature is in the range of 120–170° C.

3. Method according to claim 1 wherein said alkyladamantane is selected from the group consisting of 1-methyladamantane, 1-ethyladamantane, 1,3-dimethyladamantane, 1-methyl-3-ethyladamantane, 1,3,5-trimethyladamantane and 1,3-dimethyl-5-ethyladamantane.

4. Method according to claim 1 wherein said oxygen-containing gas is air.

5. Method according to claim 4 wherein the pressure is about atmospheric.

References Cited

Schleyer et al.: J. Am. Chem. Soc., vol. 83, pp. 182–7 (1961).

LEON ZITVER, *Primary Examiner.*

BERNARD HELFIN, *Examiner.*

T. G. DILLAHUNTY, *Assistant Examiner.*